2 Sheets—Sheet 1.

W. C. EBERT.

Assignor to J. HARRIS & D. P. SMITH.

Lamp-Extinguisher.

No. 8,309. Reissued July 2, 1878.

WITNESSES:
T. S. West.
Cornelius Cox

INVENTOR:
WM. C. EBERT,
BY
H. W. Beadle & Co
ATTYS.

N. PETERS, PHOTO-LITHOGRAPHER, WASHINGTON, D. C.

2 Sheets—Sheet 2.

W. C. EBERT.

Assignor to J. HARRIS & D. P. SMITH.

Lamp-Extinguisher.

No. 8,309. Reissued July 2, 1878.

WITNESSES:

J. S. West.

Cornelius Cox

INVENTOR:

WM. C. EBERT

BY

H. W. Beadle & Co.

ATTYS.

N. PETERS, PHOTO-LITHOGRAPHER, WASHINGTON, D. C.

UNITED STATES PATENT OFFICE.

WILLIAM C. EBERT, OF HANNIBAL, MISSOURI, ASSIGNOR TO JAMES HARRIS AND DANIEL P. SMITH.

IMPROVEMENT IN LAMP-EXTINGUISHERS.

Specification forming part of Letters Patent No. 102,926, dated May 10, 1870; Reissue No. 8,309, dated July 2, 1878; application filed May 10, 1878.

*To all whom it may concern:*

Be it known that I, WILLIAM C. EBERT, of Hannibal, county of Marion, and State of Missouri, have invented a new and useful Improvement in Lamp-Extinguishers; and I do hereby declare the following is a full, clear, and exact description of the same, reference being had to the accompanying drawings, and to the letters of reference marked thereon.

This invention relates to that class of lamps which are provided with mechanism for extinguishing the flame when the lamp tips over; and consists, mainly, first, in a combination, broadly, of an extinguishing device upon the burner, which device is itself inoperative, a certain lever mechanism, with mechanism upon the body of the lamp for actuating the extinguishing device, the construction being such that the actuating mechanism will automatically move the extinguishing device to put out the flame when the lamp falls or tips over, and also will restore the parts to their normal condition when the lamp is replaced in its proper position; second, in the combination of an extinguishing device upon the burner with an independent sleeve or hand-piece upon the lamp, adapted to move in a vertical direction, for the purpose of actuating the extinguisher, either to hold the latter away from the flame, or to move the same in contact therewith, for the purpose of extinguishing the same; third, in the combination of an extinguishing device upon the burner with an independent spring mechanism upon the lamp, adapted to actuate automatically the extinguisher when the lamp tips over; fourth, in the combination of an extinguishing device upon the burner, a certain lever mechanism, with an actuating mechanism extending through the base of the lamp, so as to be held in an inoperative position when the lamp rests upon table or other support.

It further consists in certain details of construction, all of which will be fully described hereinafter.

Figure 1:
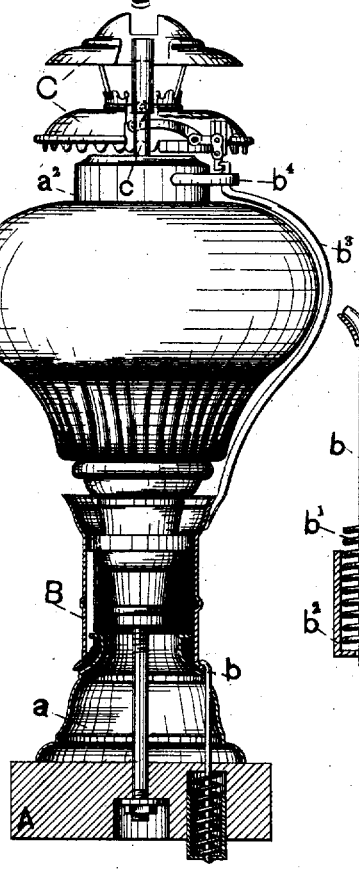
Figure 3:
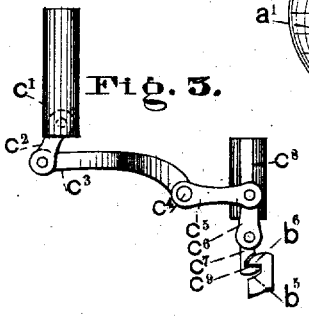
Figure 4:
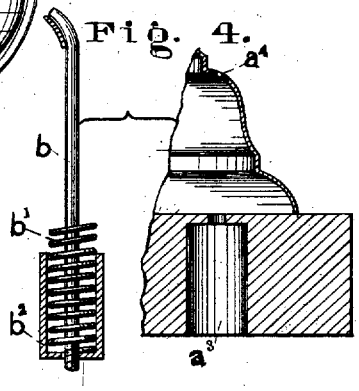
Figure 2:
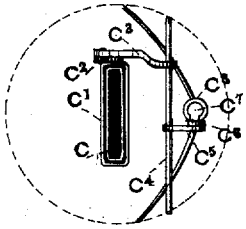

In the drawings, Figure 1 represents a side elevation of a lamp having my improvements applied thereto, the extinguishing devices being represented in proper position to extinguish the flame. Fig. 2 represents a transverse view of the burner; Fig. 3, an enlarged view of the extinguishing devices detached; Fig. 4, enlarged views of a portion of the base of the lamp and the actuating mechanism; and Fig. 5, an elevation of the lamp, showing the extinguishing devices in proper position to permit the flame to burn.

To enable others skilled in the art to make and use my invention, I will now proceed to describe fully its construction and manner of operation.

A, Fig. 1, represents the base-block of the lamp; $a$, the standard; $a^1$, the bowl, and $a^2$ the collar, which parts do not differ in their general construction from those common to this class of lamps. $a^3$ represents a vertical recess in the base-block, and $a^4$ a vertical opening through the standard communicating with the recess, as shown.

Figure 5:
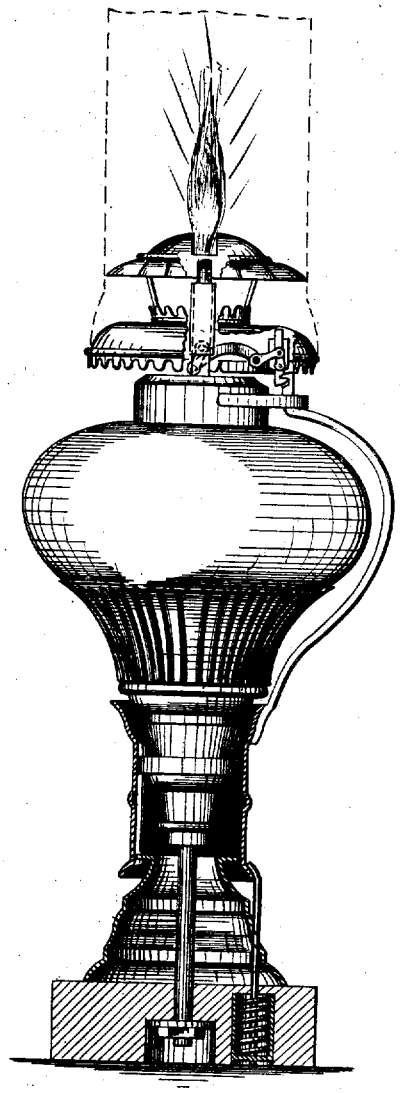

B, Fig. 1, represents a sleeve surrounding the standard or stem of the lamp, which is free to move in a vertical direction, it being shown in its lowest position in Fig. 1, and highest in Fig. 5. This sleeve, it will be observed, serves as a hand-piece, by means of which the lamp may be readily lifted when desired. $b$ represents a rod of proper length, which is rigidly secured at its upper end to the sleeve, and extends in a downward direction through the vertical opening $a^4$, Fig. 4, and the recess $a^3$, as shown.

$b^1$, Fig. 4, represents a spring surrounding the lower end of the rod within the recess, as shown in Fig. 1. $b^2$ represents a case or cylinder, closed at one end, inclosing the spring, as shown, the lower end of which is secured in any proper manner to the lower end of the rod. The spring, it will be observed, has a bearing above against the upper wall of the recess, and below against the case $b^2$, attached to the lower end of the rod $b$.

The length of the spring is such also, it will be observed, that when it is free to expand the lower portion will project downward beyond the bottom line of the base-block, as shown in Fig. 1.

$b^3$, Fig. 1, represents a bent rod, secured at its lower end to the sleeve, as shown, which extends about the bowl in an upward direction, and is held above by a guide-arm, $b^4$, extending out from the collar $a^2$ of the lamp, as shown.

$b^5$, Fig. 3, represents a notch or recess in the upper end of the rod, by means of which and the consequent projection $b^6$ a hook is formed, for purposes hereinafter explained.

C, Fig. 1, represents the burner, constructed generally in any proper manner. $c$, Figs. 1 and 2, represents the wick-tube, and $c^1$, Figs. 2 and 3, an extinguisher-tube, adapted to slide freely upon the same in a vertical direction, as shown. $c^2$ represents a connecting-rod, secured at its upper end to the extinguisher-tube, as shown, and at its lower end to the end of the arm $c^3$, projecting outward at right angles from the transverse rock-shaft $c^4$, as shown. $c^5$ also represents an arm projecting at right angles from the rock-shaft on the opposite side, as shown; and $c^6$, an intermediate link, by means of which this arm is connected to the bolt or rod $c^7$, held in the slotted tube $c^8$ in such manner as to move freely in a vertical direction.

The rock-shaft $c^4$ and its connections serve, it will be observed, as lever mechanism for actuating the auxiliary wick-tube.

$c^9$ represents a notch or recess cut in the lower end of the bolt or rod $c^7$, by means of which and the consequent projection a hook is formed, which is adapted to engage with the similarly-formed termination of the rod $b^3$, as shown.

By means of this construction provision is made for unscrewing the burner and removing the same, when it is desired to do so, without disturbing the parts attached to the body of the lamp.

When the burner is replaced again a connection between the two devices will be readily made by screwing the burner to its place.

The operation is substantially as follows: When the lamp is resting upon the table, as shown in Fig. 5, the rod $b$ will be held by contact with the table in its upward position against the action of the spring $b^1$. The sleeve or hand-piece attached to the rod will also be elevated, and so also the rods $b^3$ and $c^7$ connected therewith and the arm $c^5$ of the rock-shaft $c^4$, by which means the arm $c^3$ and the extinguisher-tube connected therewith will consequently be depressed. In consequence of this action the extinguisher-tube will be held down below the top of the wick-tube, so that it cannot interfere in any way with the flame of the lamp. When, also, the lamp is carried in the hand, the parts are held in the same relative position, as the sleeve or hand-piece in this case is supported in its raised position by the hand. When, however, the lamp is dropped or is tipped over, the spring $b^1$ is free to act and the sleeve or hand-piece B to fall, so that these parts and their immediate connections are moved into their lower position, (shown in Fig. 1,) and consequently the arm $c^3$ and the extinguisher-tube connected therewith are thrown upward to extinguish the flame.

Some of the advantages of the described construction are as follows: By means of the combination of an actuating device on the body of the lamp with an extinguisher upon the burner a positive control of the extinguishing device is obtained without any special adjustment of the parts. For example, the lamp may be tipped or tilted by the bowl, if desired to extinguish the flame, and then be at once restored to its normal condition ready for relighting by simply setting the same squarely on its base. By means of this combination, also, the lamp is not liable to be accidentally extinguished when there is no occasion for it. For example, it may be carried in the hand and be tipped in any direction within the limits of safety without extinguishing the flame.

By the employment of the sleeve or hand-piece the actuating device is properly controlled, when it is desired to lift the lamp, without requiring exercise of judgment or thought by the person using the same.

I am aware that an actuating device has been attached to an auxiliary wick-tube, for the purpose of operating the same, to diminish the flame when the lamp rests upon a table; but this feature I do not claim.

Having thus fully described my invention, what I claim as new, and desire to secure by Letters Patent, is—

1. The combination, broadly, of a device on the burner for extinguishing the flame, and lever mechanism, substantially as described, with mechanism, substantially as described, on the body of the lamp for actuating the lever mechanism.

2. The combination of an extinguishing device upon the burner with an independent sleeve upon the lamp, adapted to move in a vertical direction, for the purpose of actuating the extinguisher, substantially as described.

3. The combination of an extinguishing device upon the burner with independent spring mechanism upon the body, adapted automatically to actuate the extinguishing device when the lamp tips over, substantially as described.

4. The combination of an extinguisher on the burner, having lever mechanism for moving the same, substantially as described, with actuating mechanism extending through the base of the lamp, adapted to hold the extinguishing device in an inoperative position when the lamp rests on a table or other support, substantially as described.

5. In combination with the sliding tube in the burner, the intermediate connections and the sleeve B, substantially as described.

6. In combination with an actuating device fixed upon the body of the lamp, an extinguisher and lever mechanism for moving the same, located upon the removable burner, as described.

7. In combination with the extinguisher, the intermediate connections and spring $b^1$, as described.

8. In combination with the extinguisher of a lamp, an actuating device, substantially as described, which is projected below the lower surface of the lamp while extinguishing, and which has its movement reversed to uncover the wick by contact with the support on which the lamp may be placed.

9. In a self-extinguishing lamp, a device, substantially as described, which prevents extinguishing by means of its contact with the support on which the lamp stands when it rests, as and for the purpose set forth.

10. A self-extinguishing lamp, substantially as described, so constructed that its extinguisher is prevented from operating when lifted by its hand-piece, but which will be operated if lifted by its bowl.

11. A self-extinguishing lamp, substantially as described, constructed in such manner that it will be prevented from extinguishing when it is carried in an inclined position with the hand-piece in the grasp, but which will allow the extinguisher to be operated when the grasp is released.

12. A self-extinguishing lamp, substantially as described, constructed in such manner that it will, by its weight, when placed upon a table or other support, set the extinguisher in position ready to extinguish the flame when the lamp is accidentally overturned.

13. In a self-extinguishing lamp, a removable burner provided with an extinguisher, and an operating device connected to the extinguisher in such manner that its upward movement will cause the extinguisher to move downwardly away from the wick, and its downward movement will move the extinguisher in an upward direction to surround the wick and extinguish the flame.

14. In combination with a lamp having an extinguishing device attached to a removable burner, an independent actuating device attached to the lamp, and intermediate means, substantially as described, for uniting the two together.

15. In combination with a self-extinguishing lamp, a hand-piece to be grasped when the lamp is to be carried, and which requires movement to allow the extinguisher to be operated, but is prevented from moving when the lamp is carried with the hand-piece in the grasp.

This specification signed and witnessed this 26th day of April, 1878.

WM. C. EBERT.

Witnesses:
F. H. TIBBITS,
H. S. EBERT.